United States Patent
Platte et al.

[11] Patent Number: 6,128,148
[45] Date of Patent: *Oct. 3, 2000

[54] MEMORY DEVICE HAVING MULTIPLE MEMORY REGIONS FOR A RECORDING DEVICE

[75] Inventors: Hans-Joachim Platte, Hemmingen; Ernst F. Schröder, Hannover, both of Germany

[73] Assignee: Deutsche Thomson-Brandt GmbH, Villingen-Schwenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/625,433

[22] Filed: Mar. 26, 1996

Related U.S. Application Data

[63] Continuation of application No. 08/211,999, Jul. 11, 1994.

[30] Foreign Application Priority Data

Oct. 26, 1991 [DE] Germany ............................. 41 35 419
Oct. 19, 1992 [WO] WIPO ..................... PCT/EP92/02399

[51] Int. Cl.[7] .................................................. G11B 15/04
[52] U.S. Cl. ................................................ 360/60; 360/27
[58] Field of Search ............................. 360/60, 69, 72.2, 360/74.4, 74.5, 13, 14.1, 27, 132, 137, 5, 31; 235/462, 375, 380; 395/425, 469; 380/30, 2, 3, 4, 5

[56] References Cited

U.S. PATENT DOCUMENTS

| | | | |
|---|---|---|---|
| 4,338,644 | 7/1982 | Staar | ...................................... 360/69 X |
| 4,383,285 | 5/1983 | Staar | ...................................... 360/69 X |
| 4,426,684 | 1/1984 | Sechet et al. | .......................... 360/13 X |
| 4,593,337 | 6/1986 | Leong et al. | ........................ 360/74.4 X |
| 4,644,436 | 2/1987 | Unno | ........................................ 360/137 |
| 4,930,158 | 5/1990 | Vogel | .......................................... 380/5 |
| 5,060,219 | 10/1991 | Lokhoff et al. | ............................ 360/60 |
| 5,083,224 | 1/1992 | Hoogendoorn et al. | .................. 360/60 |
| 5,130,864 | 7/1992 | Shimada | ................................... 360/60 |
| 5,142,579 | 8/1992 | Anderson | ................................. 380/30 |
| 5,214,556 | 5/1993 | Kilbel | ..................................... 360/137 |
| 5,262,905 | 11/1993 | Takagi et al. | ............................ 360/53 |
| 5,291,346 | 3/1994 | Baekgaard | ................................ 360/60 |

FOREIGN PATENT DOCUMENTS

| | | |
|---|---|---|
| 2943409 | of 0000 | Germany . |
| 1-162286 | of 0000 | Japan . |
| 63-136379 | of 0000 | Japan . |
| 62-157391 | 7/1987 | Japan ............................. G11B 27/10 |
| 8910615 | of 0000 | WIPO . |

OTHER PUBLICATIONS

Patent Abstracts of Japan, vol. 13, No. 430, p. 937, and Japan Patent 1–162286 (listed above).

Patent Abstracts of Japan, vol. 12, No. 396, p. 774, and Japan Patent 63–136379 (listed above).

*Primary Examiner*—Andrew L. Sniezek
*Attorney, Agent, or Firm*—Joseph S. Tripoli; Joseph J. Laks; Francis A. Davenport

[57] ABSTRACT

An electronic memory apparatus for a device containing a recording medium for storing information. The device cooperates with a recording or reproducing instrument when said device is disposed therein, and is controllable by a data processing and control circuit. The memory apparatus has a first, programmable memory section, which is alterable by a user of the device, for storing data pertaining to the use of the device, and a second, programmable memory section for storing data pertaining to the characterization of the information which may be recorded on said recording medium.

2 Claims, 2 Drawing Sheets

| | |
|---|---|
| x3f | Fixed data |
| x00 | Usage, here: blank cassette |
| 00 | Data records, still empty |
| . | |
| . | |
| . | |

Fig. 1

| | |
|---|---|
| x3f | Fixed data |
| x01 | Usage, here: private, camcorder |
| 01 | Start min |
| 00 | sec |
| 04 | Finish min |
| 10 | sec |
| 00 | Additional data, here: free access allowed |
| 00 | Additional data, here: empty |
| 04 | Start min |
| 10 | sec |
| 10 | Finish min |
| 00 | sec |
| 01 | Additional data, here: overwrite blocked |
| 00 | Additional data, here: empty |
| 10 | Start min |
| 10 | sec |
| 20 | Finish min |
| 05 | sec |
| 02 | Additional data, here: playback blocked |
| 33 | Additional data, here: indentification for playback |

201 — overwrite blocked row
202 — playback blocked row
203 — identification row

Fig. 2

| | |
|---|---|
| x3f | Fixed data |
| xff | Usage, here: prerecorded cassette |
| x02 | Serial number, 1st byte |
| x34 | Serial number, 2nd byte |
| 02 | Usage authorization, here: playback allowed |
| 01 | Start min |
| 00 | sec |
| 04 | Finish min |
| 10 | sec |
| 00 | Additional data |
| 00 | Additional data |
| 04 | Start min |
| 10 | sec |
| 10 | Finish min |
| 00 | sec |
| 00 | Additional data |
| 00 | Additional data |

MEMORY DEVICE HAVING MULTIPLE MEMORY REGIONS FOR A RECORDING DEVICE

CROSS REFERENCE TO RELATED APPLICATIONS

This is a continuation of U.S. application Ser. No. 08/211,999 filed Jul. 11, 1994.

BACKGROUND OF THE INVENTION

The invention concerns an electronic memory device for a magnetic tape cassette and a recording and/or reproducing apparatus suitable for this, in particular a video recorder with digital processing of digitally coded video/audio signals. The magnetic tape cassette has a housing containing one or more reels of magnetic tape as well as the electronic memory device which can be connected via connecting means to the recording and/or reproducing device and which can be controlled by this in the sense of an evaluation of the information stored, and which contains information for preventing and/or enabling certain operating states of the recording and/or reproducing device.

A magnetic tape cassette having an electronic memory device, electrical connecting means and a possibility for being controlled through a recording and/or reproducing device, in the sense of an evaluation of the information stored, is known from DE-PS 29 43 409. In this case there is provision for storing the respective current tape position and, if applicable, additionally characteristic data which concern the magnetic tape cassette itself and/or the magnetic tape of the cassette itself, for example, the type of cassette or the advantageous level of the bias. (premagnetization). The first data are variable data in the sense of a tape counter which merely serve for defining the momentary position of the tape. The additional data are fixed data which are stored just once and for all, reflecting tape or cassette parameters such as the nonvariable mechanical or magnetic properties of the cassette. There is no provision for altering these data or using them to directly influence or block the recording and/or reproduction functions.

SUMMARY OF THE INVENTION

The object behind the invention consists of reliably blocking undesired or unallowed operating states of the recording and/or reproduction device, in conjunction with a certain recording medium or a certain magnetic tape cassette, and enabling only desired or allowed operating states when this magnetic tape cassette is inserted into the recording and/or reproduction device. An undesired operating state can be, for example, the recording function if the cassette already contains recordings and these are not to be overwritten or erased.

Unallowed operating states can appear in connection with the reproduction (playback) function. For example, it may be of interest to a private user to only permit the reproduction of information recorded by him/herself by authorized persons and not just anyone, for example, by entering a password or a pass cipher. Thus, for example, a childproof lock may be realized. Further non-permitted operating states arise in the field of commercial usage, for example, in the sale or loan of prerecorded magnetic video tape cassettes (video hire store). The vendor or lender of such cassettes may be interested in that, for example, stolen cassettes can in no way be played back, and that cassettes for which a certain hire price has been paid can only be played back a certain number of times or that only certain parts of the recorded information can be played back.

The task is solved according to the invention by means of a memory device with the features according to claim 1. Advantageous further developments and embodiments of the invention are described in the subclaims.

In the following the invention is explained in more detail by means of embodiment examples, with reference to the drawing FIG. 1 through FIG. 3. The drawings illustrate:

BRIEF DESCRIPTION OF THE DRAWINGS

FIG. 1 An embodiment example for the memory content of the electronic memory device into which information has been written described in the case of an empty (blank) cassette.

FIG. 2 An embodiment example for the memory content of the electronic memory device into which information has been written described in the case of a cassette used by a private user for the first time.

DESCRIPTION OF THE PREFERRED EMBODIMENTS

Figure 3:
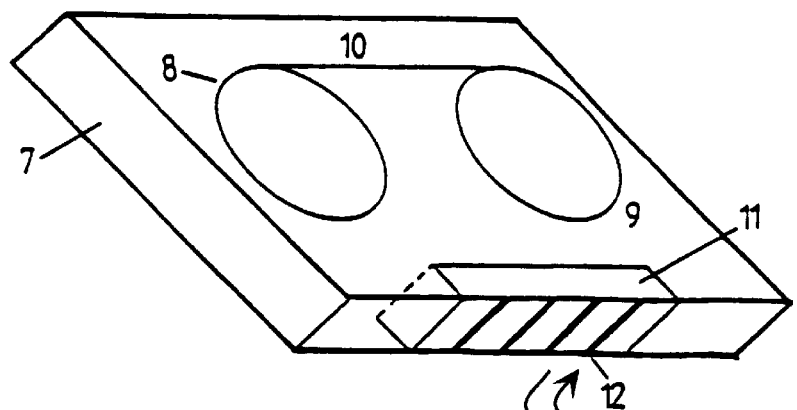
FIG. 3 An embodiment example for the memory content of the electronic memory device into which information has been written described in the case of a cassette destined to be loaned or sold.

The electronic memory illustrated in FIGS. 1 through 3 is divided into connected units of differing lengths, for example, into bytes each with a length of 8 bits, or into groups of bytes.

The first byte contains, in a manner actually already known, information about the cassette itself, the type of cassette, the length of magnetic tape contained therein or the type of the magnetic tape, for example, x3f (x for hexadecimal representation) in this case. This information does not change.

Information on the use of the cassette is stored in the second byte. This information can be altered just once when the cassette is first used, afterwards this information too cannot be altered.

With the memory content of a blank cassette shown in FIG. 1, 00 is, for example, entered here, whereby this identification at the same time permits a one-off alteration of the entry. In a blank cassette the remainder of the memory content is unimportant and therefore arbitrary; it may remain, for example, constant at 00.

The memory content of a cassette used for the first time in a camcorder by a private user shown in FIG. 2 is characterized at the second position, for example, by the entry 01. A cassette used for the first time in a video recorder could then, for example, be characterized by 02, a cassette used for the first time in an audio recorder by 03.

The following memory section in FIGS. 1 and 2 serves for the characterization of a combination of the starting point, finishing point and duration of a respective recording. Here, for example, a data record consisting of the starting time in minutes and seconds, the finishing time in minutes and seconds and several bytes for additional information is represented. Such a data record is provided for each recording on the magnetic tape. On the other hand, for example, a prerecorded cassette, destined to be loaned or sold, can be characterized by xff at the second position. The memory content illustrated in FIG. 3 for the case of a prerecorded cassette deviates in that further information positions are inserted between the first two bytes and the following data records. These contain, for example, a serial number with which the cassette on which a certain program has been recorded can be unambiguously identified, and, for example, information on the type of playback authorization at another memory position.

In the following the various functions are now described which lead to preventing undesired or unallowed operating states.

1. Blank Cassette

The memory content in the case of an unused blank cassette is illustrated in FIG. 1. The identification "00" in the second memory section permits this to be altered once upon first recording on the cassette.

2. Personally Recorded Cassette

If the identification in the second memory section indicates that it is a cassette in private use, then the subdivision of the following memory sections is defined.

2.1 Recording Protection

Protection against unwanted overwriting or erasure of already existing recordings is achieved in that a recording device always performs a comparison between the current tape position and the entries in the memory. Only when this comparison indicates no possible overwriting is then the recording function released. If, however, a possible overwrite is detected, then the recording function can be completely blocked or only released after inquiry followed by confirmation. Furthermore, a complete blocking of the recording function for each individual recording can also be effected through a corresponding entry in the memory position 201 provided for additional data. This entry can be carried out and deleted again by the user with the aid of a corresponding function on the recorder or camcorder. This function described in this way thereby replaces, in an essentially more flexible form, the mechanical erasure blocking in the form of a break-off tab or a slider usual up until now.

2.2 Childproof Lock

A further possible function is the selective release or blocking of the playback for each individual recording. This can also be carried out through an entry at the position 202 provided for additional data. In this way, the playback by unauthorized persons, for example, in the form of a childproof lock, can be prevented. In order to prevent simple alteration of these entries, a password/cipher can be agreed. This can also be stored in location 203 together with the other data in the memory device.

3. Prerecorded Cassette

In the case of a cassette marked as being prerecorded, it is possible in principle, for example, to only release the playback, thus reliably preventing an unwanted erasure.

In order to reduce the risk of theft for such cassettes, a special entry may be necessary at the position provided for the usage authorization so that the playback function of a reproduction device is released at all. This entry might not, for example, be present on cassettes displayed on the shelves of a video hire store and might be first carried out at the check-out. However, as such an entry can be manipulated with the aid of suitable devices, it is even more advisable to delete all data records relating to the content in the case of the cassettes displayed on the shelves. Such a cassette is practically worthless. Only at the check-out is the cassette then identified by means of the serial number and the data records are reloaded, for example, from the memory of a computer.

Not only is it possible to generally authorize the playback of a cassette by means of an appropriate entry. Furthermore, just certain functions can be authorized for the playback. With compatible HDTV/TV recordings, it is, for example, possible to just permit the TV playback with lower resolution; for recordings with stereo sound and surround sound, the playback of the surround sound can be blocked. Further, it is also possible to design a memory position within the memory device as a counter for the number of playbacks permitted.

In addition to the typical entries for a prerecorded cassette, individual playback blocks can also be activated by the user as in the case of a cassette recorded personally by him/herself. After the cassette has been returned, such blocking entries, if necessary with pass cipher, may have remained in the memory device. However, it is also possible, without any further ado, to remove these from the memory device entirely with a total block after return or upon renewed authorization at the check-out.

4. Prerecorded Cassette with Increased Protection (Comparison with Subcode)

It is conceivable that using suitable resources the content of the memory device could be altered by unauthorized persons, and in particular the content of the memory positions characterizing the authorization. Increased protection can be created in that with a prerecorded cassette, the entire content of the memory device or parts thereof is continuously recorded as a so-called subcode along with the recording of the wanted signal. If the playback is then only released when the content of the memory device coincides with the recorded subcode, then it is sufficient to alter specifically the content of the memory device at one or a few positions in order to block playback.

Such a cassette is then also worthless as long as the stored information at those positions only known to the authorized person is again corrected by said person. Advantageous is the fact that it is not necessary to encipher the content of the memory device or to allocate an enciphering unit to the memory device.

Figure 4:
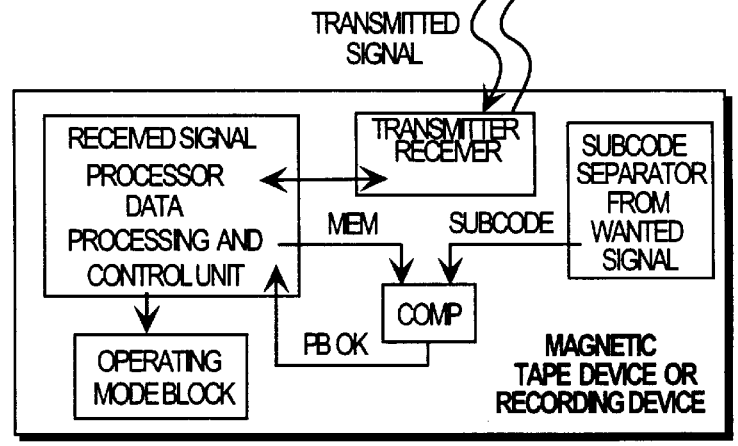
FIG. 4 A magnetic tape cassette with a memory device contained within it.

FIG. 4 shows a magnetic tape cassette 7 with a housing. The magnetic tape cassette contains two reels of magnetic tape 8 and 9 onto which a magnetic tape 10 is wound. Apart from that, the magnetic tape cassette contains a memory device 11 as described in the foregoing which can be connected or coupled to a read and/or write facility provided in a magnetic tape device on the side 12 facing the outer wall of the magnetic tape cassette. The read and/or write facility serves here as an interface or rather as a means of transmitting signals from the memory device to the magnetic tape device or vice versa. In the magnetic tape device (not illustrated), the signals received from the memory device are processed, or rather evaluated, in a data processing and/or control unit. This data processing and/or control unit controls a operating mode block as described in the foregoing.

However, use of the invention allows other blocks or releases of the magnetic tape device and the cassette with memory to be carried out.

For example, a general recording block can-be triggered by a specific (blocking) bit in the memory, whereby this bit replaces mechanical sliders/break-off tabs. The bit can be set or released by the user. An undesired recording can be generally blocked by a bit identification for the cassette, for example, cassette for rental/sale, stored in the memory.

Furthermore, specific blocking modes are conceivable which trigger a recording block with inquiry upon conflict between the tape status and existing entries in the UTOC (User Table Of Contents). This blocking mode can also be designated as a "safe record" function.

A specific recording block can also be set or released by the user inputing a new entry into the UTOC.

A general playback block is only executed if an entry exists in the UTOC and no additional blocks are set.

The user can generally block the entire cassette with/ without password (adult video) or trigger specific blocks for each entry in the UTOC with/without password.

A cassette-specific block offers itself especially in the case of cassettes for hire/sale. Here, playback in the reproduction device is then only executed when the use of the cassette is permitted, i.e. when the bit for "video hire store paid" has been set.

A further possibility for blocking is rendered possible by the comparison of the memory content with the subcode stored on the magnetic tape.

For example, playback is then only executed if a certain part of the subcode coincides with a certain entry in the memory. It is of course advantageous if each cassette is numbered, this number is available in the memory on the one hand and, on the other, is recorded in the subcode with each recording. Thus, the cassette housing (=memory) and the recorded tape then belong together.

In the following, blocking/release procedures with enciphering are described.

Let it be assumed that generally a cassette number and some further information, for example, the bit for "video hire store paid", are present and this with 64 bits, i.e. 2 * 10 exp 19 variations. Furthermore, an enciphering procedure with trapdoor and/or avalanche function is provided and each recorder contains a chip which can perform the enciphering. Trapdoor means that the coded text f(x) can be easily calculated from the plain text x. In contrast, x cannot be calculated from F(x) with justifiable effort. Avalanche means that small changes in the plain text lead to major alterations in the coded text.

Playback is only released if the coded text f'(x) read from the subcode coincides with the coded text f(x) currently enciphered from the plain text of the memory. Thus, even small changes at the relevant positions in the memory make playback immediately impossible.

With the recording block, the enciphering means a clear improvement to the known serial copy management. The plain text x from the memory and the coded text f'(x) from the subcode of the playback cassette are transmitted via the digital interface to the recorder doing the recording, for example, 2 * 64 bits.

The recorder doing the recording only switches to record if the coded text f(x) calculated anew from the transmitted x coincides with the coded text f'(x) transmitted likewise.

Simple forms of intervention in the transmission of x and f'(x), for example, reversal of one bit, cannot lead to a recording which is not actually permitted being rendered possible. The recorder doing the recording now records a new coded text in the subcode which belongs to the current cassette number, and to the current and, if applicable, modified blocking bits.

Thus, an original cassette may contain the information "one copy permitted" in the memory and unenciphered in the subcode in the memory. Following evaluation of this, the recorder doing the recording then writes the information "this is already a copy" into the memory and into the subcode. A further copying procedure is then impossible.

What is claimed is:

1. A magnetic tape cassette includes a housing, at least one spool with magnetic tape and an electronic storage device, wherein, when the magnetic tape cassette is arranged in a recording and/or reproduction equipment, the storage device is connectable thereto by a signal transmitting means and can be controlled by means of a data processing and control circuit for evaluating the stored items of information and wherein unalterable items of data, which characterize the cassette and the magnetic tape contained therein themselves or the parameters thereof, are written into a first subsection of the storage device and a second subsection of the storage device contains items of data which are dependent on the items of information stored on the magnetic tape, the storage device comprising:

(a) in the case of a blank magnetic tape cassette and during a first recording on the magnetic tape, items of data can be written once into the second subsection of the storage device where partitioning and utilization of a further recordable subsection of the storage device is defined and wherein the further subsection is provided for the storage of items of information regarding the starting and end points of the recordings and also contains items of control data for controlling a data processing and/or control device of the recording and/or reproduction equipment for selective blocking of operational modes of the recording and/or reproduction equipment; and (b) in the case of a prerecorded magnetic tape cassette, the second subsection of the storage device contains items of information regarding the identity of, and/or an authorization for reproduction from the magnetic tape cassette, the items of information may be, compared with data recorded in a subcode part of the signal recorded on the magnetic tape, the recorded subcode has at least one alteration at a predetermined tape location, which when compared with the items of information control the data processing and/or control device of the recording and/or reproduction equipment to selectively block an operational mode until the control data in the storage device is altered, a further subsection contains items of information regarding the starting and end points of the recordings.

2. An apparatus for recording and reproducing signals stored on a magnetic tape cassette comprising:

a transmitting and receiving means for communicating with said magnetic tape cassette to facilitate reading from and writing information from a memory device contained therewith;

a subcode separating means for separating said subcode from a wanted information signal recorded on said magnetic tape cassette;

a data processing device for receiving said information from said transmitting and receiving means and said subcode from said separating means; and, an operational mode controller coupled to said data processing circuit for controlling an operational mode of said reproducing apparatus, wherein said information from said memory device and said subcode are compared by said data processing device and substantial equality of said information and said subcode cause said operational mode controller to enable an operational mode of said reproducing apparatus and a dissimilarity of other than an least significant bit between said information and said subcode cause said operational mode controller to block an operational mode of said reproducing apparatus.

* * * * *